United States Patent [19]

Arnold et al.

[11] Patent Number: 4,960,832
[45] Date of Patent: Oct. 2, 1990

[54] POLYMER-SUPPORTED ALKYL AZODICARBOXYLATES AND THEIR USE IN MITSUNOBU REACTIONS

[75] Inventors: Lee D. Arnold, Streetsville; John C. Vederas, Edmonton, both of Canada

[73] Assignee: The Governors of the University of Alberta, Edmonton, Canada

[21] Appl. No.: 189,410

[22] Filed: Apr. 27, 1988

[30] Foreign Application Priority Data

Apr. 27, 1987 [GB] United Kingdom ................. 8709887

[51] Int. Cl.$^5$ ................................................ C08F 8/30
[52] U.S. Cl. ............................ 525/328.8; 525/333.6; 525/376
[58] Field of Search ........................ 525/333.6, 328.8

[56] References Cited

U.S. PATENT DOCUMENTS 3,974,135 8/1976 Folkers et al. .
3,988,307 10/1976 Gross .
4,487,715 12/1984 Nitecki et al. .
4,501,860 2/1985 Campbell et al. .

OTHER PUBLICATIONS

International Journal of Methods in Synthetic Organic Chemistry, Georg Stuttgart, 1981 No. 1 Jan. pp. 1–84 (SYNTHESIS).
Advances in Enzymology and Related Areas of Molecular Biology, F. F. Nord, vol. 32, 1969.

Primary Examiner—Bernard Lipman
Attorney, Agent, or Firm—Banner, Birch, McKie & Beckett

[57] ABSTRACT

A process for preparing an azodicarboxylate composition by chemically bonding dialkyl azodicarboxylates onto an insoluble solid polymer support. This process comprises the immobilization of hydrazodicarboxylates onto an insoluble solid polymer support and oxidizing the hydrazodicarboxylates to azodicarboxylates. The azodicarboxylate-polymer composition may be used in Mitsunobu-type reactions. After use in Mitsunobu-type reactions, the azodicarboxylate-polymer composition is recoverable and may be reused.

8 Claims, No Drawings

POLYMER-SUPPORTED ALKYL AZODICARBOXYLATES AND THEIR USE IN MITSUNOBU REACTIONS

FIELD OF THE INVENTION

This invention relates to the use of a polymer-support for immobilizing an azodicarboxylate moiety for use in conducting Mitsunobu reactions.

BACKGROUND OF THE INVENTION

As illustrated in the following scheme, Mitsunobu reactions which employ triphenylphosphine and a dialkyl azodicarboxylate are capable of replacing hydroxyl groups with a wide variety of O, N, C, and halogen nucleophiles. Scheme I:

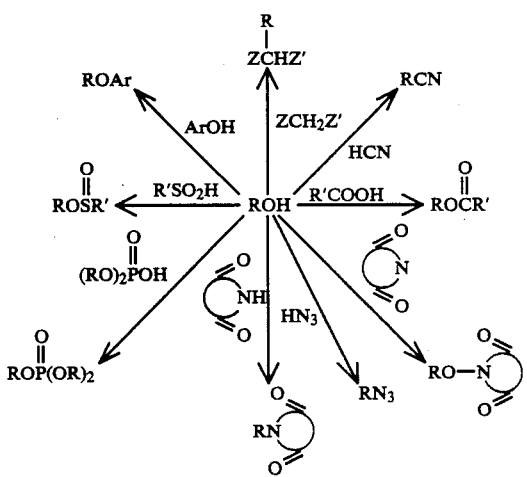

In contrast to many related condensation reactions, Mitsunobu reactions proceed under mild, essentially neutral conditions and exhibit stereospecificity, functional selectivity and regioselectivity. Because of these features the Mitsunobu reaction has been employed in synthesis of macrolide antibiotics, nucleosides, nucleoside phosphates, amino acids, amino sugars, steroids and other natural products. The method has been used to produce the anhydrothymidine precursor of the anti-AIDS drug azidothymidine (AZT), and in the direct preparation of the 3'-epimer of AZT from thymidine. More recently Mitsunobu conditions have been employed in the cyclization of β-lactams and consequently have been used in synthesis of numerous monobactam antibiotics such as aztreonam, nocardicin A analogues, and carbapenem precursors. This invention has been devised to facilitate the large scale production of chemical and pharmaceutical products which are accessible through Mitsunobu-type reactions.

Given the wide variety of potential uses for the Mitsunobu reaction, particularly in the pharmaceutical industry, industrial scale applications of this technology would be of widespread benefit. To date it has been neither safe nor economically practical to use the Mitsunobu reaction in large-scale industrial applications. The prohibitive cost of the dialkyl azodicarboxylate reagent, and the required chromatographic purification of the product from triphenylphosphine oxide and dialkyl hydrazodicarboxylate (ROOC—NHNH—COOR) side products, disfavor use of the Mitsunobu reaction. In addition, there is some danger of explosion on purification of the azodicarboxylate reagent by distillation.

This invention overcomes these earlier limitations associated with the use of Mitsunobu reactions on an industrial scale, thereby expediting and facilitating this versatile condensation method for use in the synthesis of many pharmaceuticals and related compounds.

BRIEF DISCUSSION AND SUMMARY OF THE INVENTION

To avoid the costs and dangers associated with the purification of azodicarboxylates by distillation and to avoid the requisite chromatographic purification of products the azodicarboxylate moiety has been immobilized, in accordance with an aspect of the invention, on a polymer support. This polymer resin represents an immobilized equivalent of the dialkylazodicarboxylates used in Mitsunobu-type reactions. Through utilization in Mitsunobu-type reactions the azodicarboxylate moieties bound to the resin have been chemically reduced to alkyl hydrazodicarboxylate moieties. The reduced resin is readily retrieved by filtration and may be regenerated by reoxidation with any one of a number of inexpensive oxidizing agents and used over and over. In addition, the polymer-supported azodicarboxylate is amenable to column/continuous flow and related production methods currently used in solidphase peptide synthesis.

The ability to reuse the resin is dependent on the degree of substitution of the azodicarboxylate groups on the polymer. Heavily-loaded resins are highly substituted with 1.2 milliequivalents or greater of azodicarboxylate units per gram. Lightly-loaded resins have up to 0.61 milliequivalents, possibly more, of azodicarboxylate units per gram. The degree of loading on the resin will depend on the initial loading of chloromethyl (or hydroxymethyl) functionalities present on the initial starting resin.

The advantage of the lightly-loaded resin is that it can be readily recycled after use in the Mitsunobu-type reactions. The cost of recycling the resin is estimated to be less than one tenth the cost of purchasing fresh dialkyl azodicarboxylate reagents for each Mitsunobu reaction as is the case with the current technology. By employing a polymer resin of Formula II:

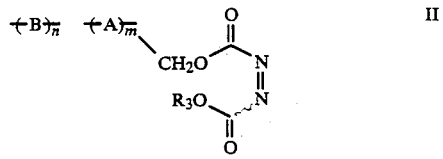

in lieu of free azodicarboxylates of formula $R_3OOC-N=N-COOR'_3$ (I), (wherein $R_3$ and $R'_3$ are protecting groups, either the same or different, of such size that they do not restrict the chemical reduction of $N=N$), a substantial cost savings is realized The costs of producing the resin should be recouped after five cycles and in some instances the costs of production are recovered after as few as two cycles.

By binding the azodicarboxylate moieties to an inert, solid support polymer resin the purification steps are greatly facilitated. The macroscopically insoluble resin being readily isolated from the reaction mixture by filtration.

Serine β-lactones are versatile synthetic intermediates which provide ready access to many rare or unusual amino acid derivatives which are suitable for direct incorporation into peptides The lactonization of N-protected derivatives of the amino acid serine can be achieved in high yield through the use of Mitsunobu reactions. Furthermore, deprotection of serine β-lactones allows production of 3-amino-2-oxetanone salts which provide numerous free β-substituted alanines in a single step. The production of optically pure α-amino acids from 3-amino-2-oxetanone salts is the subject of a copending appliction by the same inventors.

At present, the Mitsunobu-type reaction is the only practical means for synthesizing N-protected serine β-lactones. Alternative methods are inconvenient and give low yields in comparison to the yields available through the use of Mitsunobu-type reactions. Furthermore, none of the alternative methods for synthesis of N-protected serine β-lactones are compatible with the N-alkoxycarbonyl-protecting groups commonly used in peptide synthesis.

In addition to the aforementioned uses (Scheme I), other applications of the Mitsunobu reaction include: Scheme II:

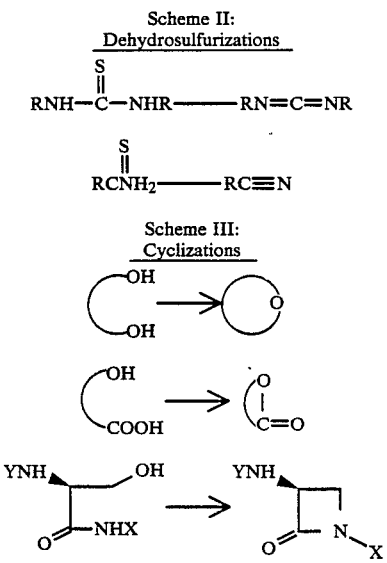

In summary, polymer-supported azodicarboxylates are suitable for general application in Mitsunobu reactions (Schemes I, II and III) and eliminate the major disadvantages associated with the conventional method. Such modifications of the Mitsunobu reaction, according to this invention, will greatly facilitate economical large-scale production of numerous chemical and pharmaceutical products.

In accordance with an aspect of the invention dialkyl azodicarboxylates of the formula $R_3OOC-N=N-COOR'_3$ (Formula I) are immobilized on a insoluble polymer solid support.

In accordance with another aspect of the invention is a process for preparing a polymer of Formula II:

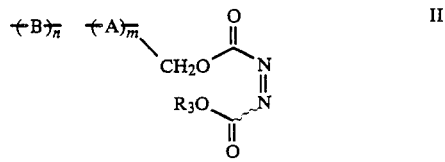

wherein
A is a polymeric building block,
B is a polymeric building block, the same as A or different from A,
$R_3$ is a protecting group of such size that it does not restrict the chemical reduction of N=N,
n is 0, 1, 2, 3, ..., and
m is 1, 2, 3, ..., The process comprising oxidizing a polymer of the Formula III:

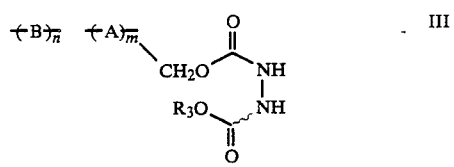

where A, B, n and m are defined as above and $R_3$ is a protecting group of such size that it does not restrict oxidation at HN—NH.

In accordance with another aspect of the invention is a polymer having the structure of Formula II and a polymer having the structure of Formula III.

In accordance with another aspect of the invention are methods of using a polymer of Formula II in a modified Mitsunobu reaction wherein a polymer of Formula II is reduced to a polymer of Formula III.

DETAILED DESCRIPTION OF PREFERRED EMBODIMENT

The principle of immobilizing the alkyl azodicarboxylate on a polymeric support is demonstrated in accordance with the following preferred embodiments of the invention. The preferred steps, which may be used in the immobilization of alkyl azodicarboxylates on a polymeric support and in the regeneration of the reduced form of the resin, are represented in Scheme IV.

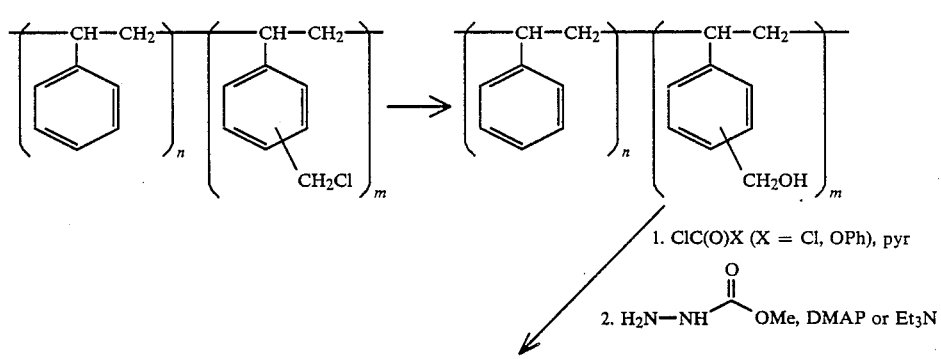

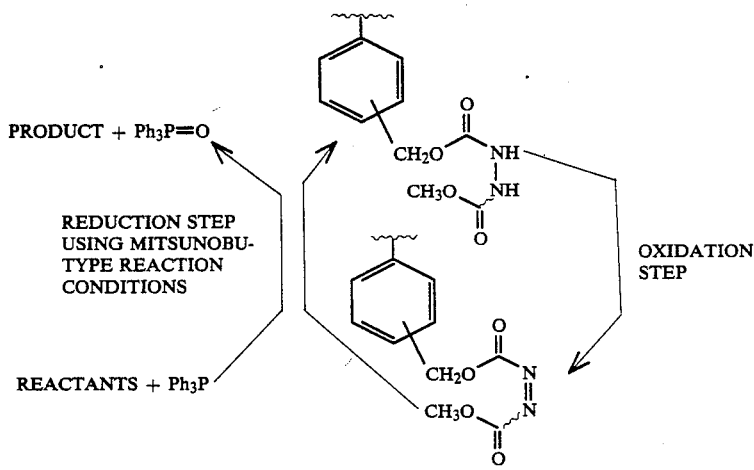

In accordance with a preferred aspect of the invention Scheme V illustrates a representative scheme for the use of a modified Mitsunobu reaction in the lactonization of N-protected derivatives of the amino acid serine wherein high yields of serine β-lactones are produced:

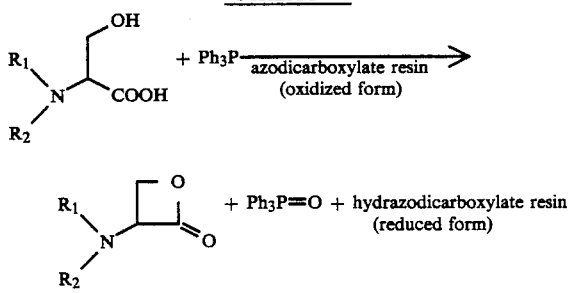

wherein

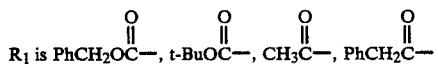

and

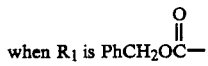

In order to maximize the yield of serine β-lactone, a modification of the usual Mitsunobu reaction conditions is required. Between temperatures of −20° C. and 25° C. in tetrahydrofuran (THF) yields of β-lactone are low (29% to 45%) and essentially independent of the order of addition of reagents. By decreasing the temperature of addition of the final component to between −50° C. and −78° C. considerably reduced the extent of decarboxylative dehydration and increased lactonization.

Further improvements in the yield of serine β-lactone can be obtained by preformation of a slurry of the triphenylphosphine-azodicarboxylate adduct followed by addition of the serine derivative at low temperature, and by the use of more polar CH₃CN cosolvent. The inclusion of at least 9% tetrahydrofuran is required to suppress the freezing point of the solvent and increase solubility of reagents.

Alternatives to the use of triphenylphosphine in Mitsunobu-type reactions include many triarylphosphines, trialkylphosphines, triarylphosphites and trialkylphosphites. However, triphenylphosphine is what is most commonly used.

In accordance with a preferred aspect of the invention, the polymeric support matrix employed is inert to the reaction conditions used in immobilization, oxidation and utilization of the alkyl azodicarboxylate functionality. According to another preferred aspect, the polymer support should be initially free of nitrogen in order to allow measurement of loading by elemental nitrogen analysis. According to another preferred aspect, it should be insoluble and possess mechanical stability to physical degradation, but have the capacity to swell considerably on solvation by organic solvents to facilitate reactions. The preferred polymeric starting material is a hydroxymethyl polystyrene resin (5% to 50% derivatized; 1–2% crosslinked) which is commercially available or readily produced from either Merrifield's peptide resin or any crosslinked polystyrene resin.

Heavily-loaded hydroxymethyl polystyrene is not commercially available but can be prepared from Merrifield chloromethyl peptide resin according to the method of Wang (Wang, S.S. *J. Org. Chem.* 1975 40, pp 1235–1239) as depicted in Scheme VI.

SCHEME VI

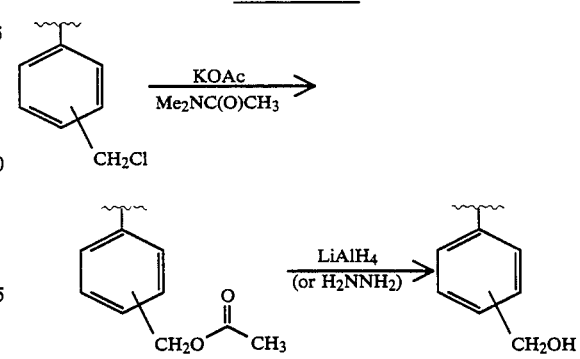

The Merrifield Resin is heated in dimethyl acetamide with potassium acetate converting the chloromethyl form of the resin to the acetoxymethyl form. Reductive deacylation is effected by treatment with lithium aluminum hydride. While this methodology is suitable on a small scale, it requires extensive washing to free the resulting hydroxymethyl resin of aluminates. For large scale applications the alternate hydrazinolysis procedure is preferred (Wang, S.S., *J. Org. Chem.* 1975, 40, pp 1235-1239). Conversion of the chloromethyl to hydroxymethyl resin via the acetoxymethyl form avoids the crosslinking by Williamson-type benzyl ether formation possible in direct hydrolysis. Less heavily loaded hydroxymethyl polystyrene resin is commercially available.

The hydroxymethyl polystyrene resin is swollen in dichloromethane or other suitable solvent and converted to the corresponding chloroformate by reaction with phosgene and pyridine. Excess reagents are removed by filtration and washing. At this stage, the resin is referred to as the "activated resin". A mixture of triethylamine and methyl hydrazinocarboxylate in $HMPA/CH_2Cl_2$ is added to the activated resin. Other basic tertiary amine nucleophilic catalysts such as 4-(dimethylamino)pyridine would serve the same purpose as the triethylamine. The solvent is removed by filtration and the resin is successively washed with MeOH, $MeOH/H_2O$, MeOH and $Et_2O$ and dried in vacuo. The methyl hydrazodicarboxylate derivatized resin thereby produced is snowy-white. Incorporation of the methyl hydrazodicarboxylate functionality is evident from the very strong carbonyl band in the IR. Other alkylhydrazodicarboxylates could be used for derivation of the resin so long as the alkyl group is of such size and configuration that it does not interfere with the subsequent oxidation step.

Prior to oxidation of the methyl hydrazodicarboxylate resin unreacted hydroxymethyl functionalities still present on the resin may be "capped" by benzoylation or any other suitable capping process. Once the methyl hydrazodicarboxylate moieties are chemically bound to the polymer resin, oxidation to the corresponding azo compounds can be accomplished with many inexpensive oxidizing agents which are compatible with the resin. Examples of such oxidizing agents would include dinitrogen tetraoxide gas, tert-butyl hypochlorite, N-bromosuccinimide, hypochlorous acid and fuming nitric acid. On a large scale, the use of an inexpensive readily available oxidizing agent, such as chlorine gas ($Cl_2(g)$) can be employed.

In accordance with an aspect of the invention, the chlorine gas oxidation may be performed utilizing a modification of the procedure of R. Warrener, R. Russel and R. Tan as published in *Austr. J. Chem.*, Vol. 34, pp. 855-870 (1981). An example of this methodology is set out in Example 4. In accordance with another preferred aspect of the invention, the methodology for oxidizing the polymer resin could employ hypochlorous acid produced from chlorine gas and water ($Cl_2/H_2O$) in an adaptation of the Rabjohn method published in *Orqanic Syntheses, Coll.*, Vol. III, pp. 375-377, (1955). Examples of this latter chlorine gas oxidation methodology are found in Example 5 and Example 13.

On a small scale, N-bromosuccinimide (NBS) in the presence of pyridine is the most rapid and convenient oxidizing agent. In accordance with a preferred aspect of the invention, the methyl hydrazodicarboxylate resin is gently stirred in $CH_2Cl_2$ or $CH_3CN$. Pyridine and then N-bromosuccinimide are sequentially added and the mixture is stirred in the dark. The resin is filtered, washed with $CH_3CN$ (until no orange color appears in the filtrate) and washed again with $Et_2O$. The resin is then dried in vacuo. The limitation of the NBS method is that it may not be economically efficient on an industrial scale.

On oxidation the snowy-white hydrazodicarboxylate resin turns bright orange, and IR on the resulting azo resin indicates >94% conversion of hydrazo units by the disappearance of N-H bands at 3360 $cm^{-1}$. The oxidized resin represents an immobilized equivalent of the dialkyl azodicarboxylates used in Mitsunobu-type reactions.

While dichloromethane can be used as a solvent in the oxidation step, acetonitrile is preferable since the succinimide side product is soluble in $CH_3CN$, thus potentially allowing the utilization of continuous flow methods.

Derivatization of the resin and its subsequent use in Mitsunobu-type reactions is conveniently carried out in a stirred, jacketed vessel equipped with a sintered glass filter at the base. Reagents are added to a stirred suspension of resin and on completion of the reaction, products and solvents are suction filtered-off leaving the resin behind for regeneration In accordance with a preferred embodiment of the process, a reaction vessel is pretreated with a 10% solution of siliconizing agent in hexane and oven dried for at least four hours at 140° C. in order to minimize adhesion of the resin to the glass. Higher yields were obtained when the resin was pre-dried in vacuo at 30° to 60° C. for 24 hours.

During the reactions, a positive pressure of argon is used at a vacuum-take off port of the vessel to maintain solvent in the top portion of the reactor vessel. This was replaced by a vacuum to remove solvents and solutes at the end of the reactions. To wash the resin, it was suspended in solvent and stirred for approximately fifteen minutes, followed by removal of the solvent by suction filtration. To dry the resin, water was placed in the outer glass jacket and heated with a thermostated coil. Vacuum was then applied to the stoppered vessel at both the vacuum take off and neck of the reactor vessel. In this fashion, the resin could be left in the reactor vessel at all times, thereby minimizing loss of resin due to handling during reactions, washes, drying, etc.

Generally the azodicarboxylate resin has been found to be stable for at least several months when stored dry in the dark.

Further details of the preferred embodiments of the invention will be understood from the following Examples which are understood to be non-limiting with respect to the appended claims.

EXAMPLE 1

Commercial hydroxymethyl polystyrene resin (from Bachem Inc.) was used in the amount of 10 grams (0.55 meq/g). The 10 grams of resin was washed with tetrahydrofuran (THF) in the presence of dichloromethane ($CH_2Cl_2$) (1:1, 2×500 ml) and dried in vacuo. The hydroxymethyl resin (~5.5 meq) was suspended in $CH_2Cl_2$ (250 ml) under dry argon, and pyridine (0.44 ml, 5.5 mmol) was added. Excess phosgene (2.28 ml at 0° C., 3.26 g, ~33 mmol) was bubbled into the reaction mixture at 25° C. for 30 minutes. After stirring for 1.5 hours at 25° C., the resin was filtered under argon and washed with dry CH$_2$Cl$_2$ (2×200 ml) to remove excess phosgene and pyridinium hydrochloride. Methyl hydrazinocarboxylate (1.50 g, 16.5 mmol, 3 meq.) and 4-(dimethylamino) pyridine (3 eq) were added to the chloroformateactivated resin in dry CH$_2$Cl$_2$ (250 ml) and the mixture was stirred at 25° C. for 16 hours. The solvent was then removed by filtration and washed successively with MeOH:H$_2$O (1:1, 200 ml), MeOH (200 ml), CH$_2$Cl$_2$ (200 ml) and Et$_2$O (2 ×200 ml) was dried in vacuo to give snowy-white methyl hydrazodicarboxylate derivatized resin.

To methyl hydrazodicarboxylate resin (9.0 g, or 3.51 meq) suspended in a suitable dry solvent, such as, CH$_2$Cl$_2$ or CH$_3$CN (200 ml), pyridine was added in dropwise fashion. N-Bromosuccinimide (0.937 g, 5.27 mmol, 1.5 eq) was added and the mixture stirred at 25° C. for one hour in the dark. The orange resin obtained was filtered, washed with CH$_3$CN (3×200 ml), until no orange color was present in the filtrate and followed by washing with Et$_2$O (2×200 ml). The orange resin was dried in vacuo.

EXAMPLE 2

The procedure of Example 1 was repeated except the resin used as the initial starting material was 1 meq/g and 1% crosslinked.

EXAMPLE 3

The procedure of Example 1 was repeated with the difference that the chloroformate resin was derivatized by adding a mixture of triethylamine and methyl carbazate in HMPA (25 ml) to the activated resin in CH$_2$Cl$_2$ (250 ml) at 0° to 5° C. and stirring for 16 hours at 25° C.

EXAMPLE 4

The procedure of Example 1 was repeated except that chlorine gas was used instead of N-bromosuccinimide/pyridine as an oxidizing agent. Chlorine gas (7.04 g, 0.3 mmol) was condensed in a measuring tube at −78° C. When the amount needed had been collected, the tube was allowed to warm up and the chlorine gas was passed quickly through a suspension of the resin (8.0 g, ~2.54 meq/g, ~20.3 mmol) in dry CH$_2$Cl$_2$ (200 ml) at room temperature. This reaction mixture was left to stir in the dark for 6 hours. After filtration of the solvent, the resin was first washed with water (2×200 ml) and then washed with Et$_2$O (2×200 ml). The yellow resin obtained was then dried at 30° C. in vacuo. Excess chlorine was used because reaction with one equivalent gave only partial oxidation. However Cl$_2$(g) may cause over-oxidation and lower yield.

EXAMPLE 5

The procedure of Example 1 was repeated except that chlorine gas was used instead of N-bromosuccinimide/pyridine as an oxidizing agent. Through the methyl hydrazodicarboxylate resin suspended in THF/H$_2$O (2:1) was bubbled 1.1 equivalents of Cl$_2$(g) while maintaining the temperature below 15° C. The mixture was stirred for 2 hours. The resin was filtered out, washed with THF and dried in vacuo. Since an excess of Cl$_2$(g) may cause over-oxidation and lower yield, it is best to monitor the oxidation by the disappearance of the N—H stretching band in IR region. If necessary, more Cl$_2$(g) may be added to complete the oxidation.

EXAMPLE 6

The procedure of Example 1 was repeated except that N$_2$O$_4$(g) was used instead of N-bromosuccinimide/pyridine an oxidizing agent. N$_2$O$_4$(g) (excess; ~2 equivalents) was passed through a suspension of methyl hydrazodicarboxylate resin (1 eq.) in CH$_2$Cl$_2$ at 0° C. The mixture was stirred 2 hours and warmed to expel excess N$_2$O$_4$(g). The resin was washed with acetone/aqueous sodium bicarbonate (1:1), acetone/H$_2$O (1:1) and THF and dried in vacuo.

EXAMPLE 7

Resin-Mediated Formation of Benzyl Benzoate

Methyl azodicarboxylate resin (6.55 g of 0.61 meq/g ~4.0 meq) was suspended in dry THF (100 ml) and allowed to swell for ~15 minutes. Benzoic acid (0.366 g, 3.0 mmol) was dissolved in THF (10 ml) and added to the resin. To the stirred mixture at 25° C. was added dropwise a solution of Ph$_3$P (0.786 g, 3.0 mmol) and benzyl alcohol (0.361 ml, 3.5 mmol) in THF (5 ml). This mixture was left to stir at 25° C. for 16 hours. Resin was then filtered and washed with CH$_2$Cl$_2$ (4×150 mL) and Et$_2$O. The filtrate and washings were concentrated in vacuo at 30° C. and flash chromatographed (3.5% EtOAC/hexane) to yield benzyl benzoate (0.417 g, 65%): IR (film) 1720 (vs), 1451 (m), 1272 (vs), 1110 (m), 710 (s), 697 (m) cm$^{-1}$; $^1$H NMR (80 MHz, CDCl$_3$) δ8.25–8.05 (m, 2H, o—PhCOO), 7.65–7.25 (m, 8H, m—, p—PhCOO, OCH$_2$PH), 5.32 (s, 2H, OCH$_2$Ph); EI—MS: 212.0839 (M+, 212.0837 calcd. for C$_{14}$H$_{12}$O$_2$), 105.0343 (Base Peak, phC=O).

EXAMPLE 8

Resin-Mediated Formation of n-Propyl Benzoate

The methyl azodicarboxylate resin (4.0 g of 0.28 meq/g, ~1.1 meq) was suspended in THF (150 ml). A solution of benzoic acid (0.134 g, 1.1 mmol) in the THF (10 ml) was added. Ph$_3$P (0.288 g, 1.1 mmol) and n-propanol (0.180 g, 0.22 ml, 3 mmol) in THF (7 ml) were added slowly at 25° C. and the mixture stirred for 26 hours. The resin was filtered and washed with CH$_2$Cl$_2$ (4×150 ml), and Et$_2$O (2×100 ml). The yellow oil obtained on concentration of filtrate and washings was purified by flash chromatography (0.5% EtOAC in hexane) to yield to 55% of n-propyl benzoate. (Using dimethyl azodicarboxylate instead of the resin, a 56% yield was obtained). FT IR (neat) on the ester 1721, 1315 (m), 1276, 1111, 711cm$^{-1}$; $^1$H NMR (80 MHz CDCl3) δ0.98 (t, 3H, —CH$_2$CH$_3$), 1.75 (m, 2H, —CH$_2$CH$_2$CH$_3$), 4.25 (t, 2H, —OCH$_2$), 7.43 (t, 3H,) 8.30 (m, 2H) (Ph); EI—MS: 164.0836 (M+, 164.0838 calcd. for C$_{10}$H$_{12}$O$_2$).

EXAMPLE 9

Resin-Mediated Lactonization of Tert-Butoxycarbonyl-L-Serine (BOC-L-Serine)

Methyl azodicarboxylate-derivatized resin (6.55 g, 4.0 meq) was swollen briefly (15 min) in dry THF (100 mL). The stirred suspension of beads was cooled to −45° C. and BOC-L-serine (473.5 mg, 2.30 mmol) was added. To this mixture at −45° C. was added a solution of triphenylphosphine (1.06 g, 4.0 mmol) in THF (5 mL) dropwise over 10 min. The suspension was stirred 30 min at −45° C., allowed to warm slowly to 0° C. over 1 h, and stirred 2 h further. H$_2$O (36μL) was added as a precautionary quench and the resin was filtered and washed with THF (2 ×100 mL) and CH$_3$CN (100 mL). The filtrate and washings were pooled and concentrated in vacuo at 35° C. The residue was flash chromatographed (35% EtOAc/hexane) to yield 242.7 mg (56%) of BOC-L-serine β-lactone: mp 119.5–120.5° C (dec); [α]$^{25}$ −26.7 (±0.2)°(c 1.0, CH$_3$CN); IR [Fluorolube (trademark) mull](CH$_2$Cl$_2$ cast) 3358 (s), 1836 (s), 1678 (vs), 1532 (s), 1291 (m), 1104 (s) cm$^{-1}$; ε1847 cm$^{-1}$ (0.1 mm KBr, THF or CH$_3$CN) 0.34 mL mg$^{-1}$ mm$^{-1}$, 64 $M^{-1}$; mm$^{-1}$; $^1$H NMR (200 MHz, CD$_2$Cl$_2$) δ5.53 (br s, 1H, NH), 5.05 (dd, 1H, 8, 6 Hz, CH), 4.47 (∼d, 2H, 6 Hz, CH$_2$O), 1.47 (s, 9H, tert-Bu); $^{13}$C NMR (50.32 MHz, CD$_2$Cl$_2$) ≃170.0 (s), 155.1 (s), 81.5 (s), 66.6 (t), 59.9 (d), 28.2 (q); Anal. Calc. for C$_8$H$_{13}$NO$_4$: C, 51.33; H, 7.00; N, 7.48. Found: C, 51.04; H, 6.97; N, 7.42; EI—MS: 188.0929 (MH$^+$, 188.0923 calcd.); CI—MS (NH$_3$) 205 (M+NH$^+$), 392 (2M+NH$_4^+$).

Alternatively BOC-L-serine β-lactone could be secured in 51% isolated yield (91% recovery) by selective crystallization as follows: The residue obtained from the filtrate (above) was treated with boiling anhydrous ether (60 mL) followed by cooling to 4° C. (16 h). Precipitated triphenylphosphine oxide (1.08 g, ∼95%) was removed by filtration. The etheral filtrate was concentrated in vacuo, and recrystallized by addition of hexane (∼60 mL) to a solution of the residue in CHC13 (3 mL) and CCl$_4$ (7 mL) until persistent cloudiness at 45° C. The mixture was filtered at 25° C. and the filtrate was cooled to −20° C. (48 h). Pure crystalline β-lactone (220.1 mg, 51% overall) was collected by filtration.

EXAMPLE 10

Resin-Mediated Formation of N-Benzylphthalimide Benzylohthalimide

The azodicarboxylate resin (4.0 g of 0.28 meq./g, ∼1.1 meq) was swollen in dry THF (150 ml) for ∼15 minutes. A solution of Ph$_3$P (0.295 g, 1.1 mmol) phthalimide (0.170 g, 1.1 mmol) and benzyl alcohol (0.119 g, 1.1 mmol) in the THF (7 ml) was added dropwise and the mixture was stirred at 25° C. for 23 hours. The resin, which had turned from orange to white color, was filtered off and washed with THF (2×100 ml) and Et$_2$O (2×100 ml). The filtrate and washing were concentrated under vacuum and purified by preparative TLC in benzene to give N-benzylphthalimide (0.149 g, 60% yield).

EXAMPLE 11

Methyl Hydrazodicarboxylate-Derivatized Polystyrene Resin

Hydroxymethyl resin (19.0 g, ∼19 meq, 1.0 meq/g) was stirred in CH$_2$Cl$_2$ (350 mL) with pyridine (1.53 mL, 19.0 mmol) in a dry atmosphere, and excess phosgene (8.0 mL at 0° C., 11.3 g, ∼114 mmol) was bubbled into the stirred mixture at 25° C. over 30 min. The mixture was stirred 1.5 h at 25° C., solvent was removed by filtration under dry Ar, and the chloroformate form of the resin was washed with dry CH$_2$Cl$_2$ (3×5 min, 250 mL) to remove excess phosgene and pyridinium hydrochloride. A mixture of triethylamine (7.95 mL, 57 mmol) and methyl hydrazinocarboxylate (5.14 g, 57 mmol) in HMPA (25 mL) and CH$_2$Cl$_2$ (250 mL) was added to the activated resin at 0–5° C., and stirred 16 h at 25° C. The solvent was removed by filtration and the resin was washed successively with MeOH (250 mL), MeOH/H$_2$O (1:1, 250 mL), MeOH (250 mL), and Et$_2$O (2×250 mL) and dried in vacuo at 60.C to provide approximately 20.3 g (∼98%) of snowy-white derivatized resin: IR 3380 (s, br), 3310 (s, br), 3082 (s), 3060 (s), 3030 (s), 3002 (m), 2925 (vs, br), 2850 (m), 1945 (w), 1860 (w), 1800 (w), 1790–1680 (vs, vbr), 1601 (vs), 1583 (s), 1500 (m), 1450 (m, br) cm$^{-1}$; Anal. Calc. for 8.75 mol% loading or ∼0.75 meq/g, (C$_{8.350}$H$_{8.524}$N$_{0.175}$O$_{0.349}$)×(ave. unit FW 116.92): C, 85.77; H, 7.35; N, 2.09. Found: C, 85.33; H, 7.28; N, 2.07.

EXAMPLE 12

Oxidation of Methyl Hydrazodicarboxylate-Derivatized Polystyrene Resin to Methyl Azodicarboxylate-Derivatized Polystyrene Resin Methyl hydrazodicarboxylate resin (17.0 g, ∼12.7 meq at 0.75 meq/g) was gently stirred in CH$_2$Cl$_2$ or CH$_3$CN (250 mL) and pyridine (1.55 mL, 19.0 meq) was added followed by N-bromosuccinimide (18.4 mmol, 3.28 g) The mixture was stirred 1 h in the dark, and filtered. The resin was washed with CH3CN (3×250 mL, until no orange color in filtrate) and Et$_2$O (2×250 mL) and dried in vacuo at 45° C. to provide 16.84 g (∼99%) of the azo resin as a bright orange resin: IR 3540 (vw), 3360 (vw), 3100 (w), 3080 (m), 3055 (s), 3020 (vs), 2998 (m), 2920 (vs, br), 2845 (m), 1940 (w), 1920 (w), 1780 (vs, br), 1744 (m, sh), 1600 (s), 1581 (m), 1491 (vs), 1450 (s) cm$^{-1}$; From comparison of the absorbance ratios A(3360/3320) and A(3540/3320) with those of the commercial hydroxymethyl polystyrene resin and the hydrazo resin an estimate of the percent of residual CH$_2$O—H and N—H units could be obtained. Typically this suggests 5 (±)% of unoxidized hydrazo units (i.e., >94% yield in oxidation) and 8 (±3)% of underivatized hydroxymethyl units. Anal. Calc. for 8.75 mol% azodicarboxylate units (∼0.74 meq/g azodicarboxylate units), (C$_{8.350}$H$_{8.350}$N$_{0.1748}$O$_{0.3296}$)×(av. unit FW 115.7I): C, 85.90; H, 7.2!; N, 2.09. Found: C, 85.61; H, 7.36; N, 1.91. Reaction with excess Ph$_3$P and BOC-serine, suggests 0.61 (±0.03) meq/g of usable azodicarboxylate units (86% of total azo units) based on chromatographic recoveries of unreacted tri-phenylphosphine, and Ph$_3$P=O byproduct. Both the elemental analysis (±0.3%) and this value of reducible azodicarboxylate units remained constant (±0.3 meq/g) over the five oxidation/Mitsunobu reaction cycles in which this resin was employed.

EXAMPLE 13

Oxidation of Resin using Hypochlorous Acid

Hydrazo resin (2.02 g, 0.55 mmol) was suspended in 40 ml THF/H$_2$O (1:1) and cooled in ice. Chlorine gas (0.55 mmol) was passed through the resin suspension and the mixture stirred at 5–10° C. for 6 hrs in the dark. The solvent was then filtered off and the yellow resin obtained was washed twice with water then twice with 10% NaHCO$_3$ and twice more with water. The resin was then washed with acetone (2×200 ml) then Et$_2$O (2×200 ml) and dried under vacuum at ∼40° C. IR showed absence of—NH peak at 3080 cm$^{-1}$. Anal. Calc. for (C$_{8.1968}$H$_{8.2127}$N$_{0.0905}$O$_{0.1968}$)×(av. unit FW 111.15): C, 88.58; H, 7.45; N 1.14. Found: C, 86.41; H, 7.44; N 1.11. Reaction of this oxidized resin with Ph$_3$P and H$_2$O indicated 0.263 meq/g (>95%) of usable azo functionalities.

EXAMPLE 14

Oxidation of Resin using Dinitrogen Tetraoxide gas

Fresh resin (2.0639 g, ~0.57 mmol) was suspended in $CH_2Cl_2$ (150 ml) at 0° C. and nitrogen tetroxide gas was bubbled through the solution for a few seconds. The yellow resin obtained was then filtered and washed with $CH_2Cl_2$ (2×150 ml) and $Et_2O$ (2×150 ml). IR (Fluorolube (trademark) mull) indicated incomplete oxidation of the resin. Anal. Cal. for $(C_{8.1968}H_{8.2127}N_{0.0905}O_{0.1968}) \times$ (av. unit FW 111.15): C, 88.58; H, 7.45; N, 1.14. Found: C, 87.02; H 7.67; N, 1.54. The high percentage of nitrogen may be due to addition of —NO in addition to oxidation.

EXAMPLE 15

Alternate Method for Activation of Hydroxymethyl Polystyrene Resin to Avoid use of Phosgene Hydroxymethyl resin (1.38 g, 5.79 meq) Was suspended in $CH_2Cl_2$ (15 mL) and phenyl chloroformate (1.09 mL, 8.70 mmol) was added at 0° C. Pyridine (0.75 mL, 9.3 mmol) was added carefully at 0° C. to this stirred mixture. After gentle stirring 16 h at 0° C., the resin was filtered and washed with $CH_2Cl_2$, acetone (3×), THF and $Et_2O$ (2×) (25 mL) each and dried in vacuo at 50° C.: yielding (phenyloxycarbonyl)oxymethyl-polystyrene resin; IR [Fluorolube (trademark) mull]2920 (s), 1760 (vs), no detectable OH stretch; Solid State $^{13}C$ NMR (50.30 MHz) 153 (C=0), 146, 138, 123 (Ar), 71 ($ArCH_2CO_2Ph$), 52-35 ($CH(Ar)CH_2$) ppm; Anal. Calc. for 50.1 mol% phenylcarbonate residues (~2.8 meq/g): C., 80.42; H, 6.19; 0, 13.39. Found: C, 79.36; H, 6.17; 0, 13.10.

The methyl hydrazodicarboxylate resin was then prepared from the (phenyloxycarbonyl)oxymethyl-polystyrene resin.

Phenylcarbonate resin (2.00 g, ~5.57 meq) was suspended in DMF (20 mL) and treated with methyl carbazate (1.57 g, 17.4 mmol) and 4-(dimethylamino)pyridine (1.07 g, 8.7 mmol). After stirring 5 days at 25° C. the mixture was diluted with $H_2O$ (20 mL), and filtered. The resin was washed with (1:1) $MeOH/H_2O$ (3×50 mL), MeOH (2×50 mL), and ether (2×50 mL) and dried in vacuo at 60° C. Analyses indicate ~70 mol% of derivatized units are in the methyl hydrazodicarboxylate form and ~30% in the phenylcarbonate form: IR [Fluorolube (trademark) mull]3300 (s, br), 2920 (s), 1720 (vs), 1601 (m) cm$^{-1}$; Comparison of IR band intensity ratios (NH, Ar(CH), C=0) with those of the phenylcarbonate resin and the hydrazo resin suggests 30% phenylcarbonate/70% hydrazodicarboxylate functionalities; Solid State $^{13}C$ NMR (50.30 MHz) 158 (carbamate C=0), 153 (carbonate C=0), 146 (C-1 of Ar), 128 (Ar), 68 ($ArCh_2O_2CNH$), 53 ($COOCH_3$), 52-35 ($CH(Ar)CH_2$) (see FIG. 22); Anal. Calc. for 35 mol% of total units as methyl hydrazodicarboxylate residues and 15 mol% in phenyl carbonate form: C, 71.23; H, 6.23; N, 5.53. Found: C, 69.32; H, 6.16; N, 5.36. From the N analysis this suggests 1.91 meq/g hydrazo units.

Although preferred embodiments of the invention are described herein in detail, it will be understood by those skilled in the art that variations may be made thereto without departing from the spirit of the invention or the scope of the appended claims.

The embodiments of the invention in which an exclusive property or privilege is claimed are defined as follows:

1. An insoluble azodicarboxylate composition comprising the immobilization of azodicarboxylates on an insoluble solid polymer support.

2. The insoluble azodicarboxylate composition of claim 1, having the formula:

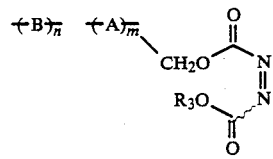

II wherein
A is a polymeric building block
B is a polymeric building block, the same as A or different from A,
$R_3$ is a protecting group of such size that it does not restrict the chemical reduction of N=N,
n is 0,1,2,3, . . . ,
m is 1,2,3, . . . .

3. The composition of claim 2 wherein, A is

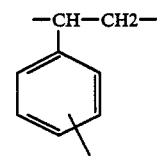

and,
B is

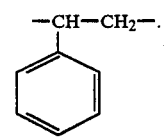

4. The composition of claim 2 wherein $R_3$ is selected from the group consisting of ethyl, methyl, isopropyl, t-butyl and benzyl.

5. The insoluble ozodicarboxylate composition of claim 1 of the formula:

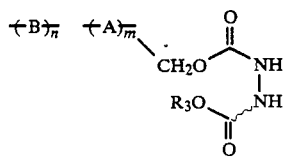

III wherein
A is a polymeric building block,
B is a polymeric building block, the same as A or different from A,
$R_3$ is a protecting group of such size that it does not restrict oxidation at HN-NH,
n is 0,1,2,3, . . . ,
m is 1,2,3, . . . .

6. The composition of claim 4 wherein,
A is and,
B is
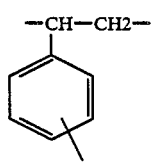
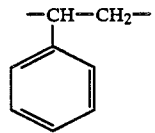
7. The composition of claim 3 wherein $R_3$ *is selected from the group consisting of ethyl, methyl, isopropyl, t-butyl and benzyl.*
8. The composition of claim 1 wherein said polymer support comprises a cross-linked polystyrene resin.
* * * * *